(12) United States Patent
van Riel (10) Patent No.: US 8,312,195 B2
(45) Date of Patent: Nov. 13, 2012

(54) MANAGING INTERRUPTS USING A PREFERRED BINDING BETWEEN A DEVICE GENERATING INTERRUPTS AND A CPU

(75) Inventor: Henri H. van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 192 days.

(21) Appl. No.: 12/707,987

(22) Filed: Feb. 18, 2010

(65) Prior Publication Data
US 2011/0202699 A1 Aug. 18, 2011

(51) Int. Cl.
*G06F 13/24* (2006.01)
(52) U.S. Cl. .......... 710/267; 710/260
(58) Field of Classification Search .......... 710/260–269, 710/48–51; 718/1
See application file for complete search history.

(56) References Cited

U.S. PATENT DOCUMENTS

| | | | |
|---|---|---|---|
| 4,649,479 A | 3/1987 | Advani et al. | |
| 4,959,781 A * | 9/1990 | Rubinstein et al. | 710/262 |
| 5,459,872 A * | 10/1995 | Connell et al. | 710/263 |
| 5,721,931 A * | 2/1998 | Gephardt et al. | 710/260 |
| 7,493,620 B2 * | 2/2009 | Parekh | 718/105 |
| 7,533,207 B2 * | 5/2009 | Traut et al. | 710/260 |
| 7,653,912 B2 * | 1/2010 | Frank et al. | 719/318 |
| 7,665,088 B1 * | 2/2010 | Bugnion et al. | 718/1 |
| 7,853,744 B2 * | 12/2010 | Mahalingam et al. | 710/262 |
| 7,873,770 B2 * | 1/2011 | Hummel et al. | 710/266 |
| 7,996,593 B2 * | 8/2011 | Blackmore et al. | 710/260 |
| 2005/0125582 A1 * | 6/2005 | Tu et al. | 710/260 |
| 2006/0101181 A1 * | 5/2006 | Post et al. | 710/266 |
| 2009/0228625 A1 * | 9/2009 | Kulkarni | 710/263 |
| 2011/0161541 A1 * | 6/2011 | Madukkarumukumana et al. | 710/260 |
| 2011/0179413 A1 * | 7/2011 | Subramanian et al. | 718/1 |

* cited by examiner

*Primary Examiner* — Raymond Phan
(74) *Attorney, Agent, or Firm* — Lowenstein Sandler PC (57) ABSTRACT

A method and system for binding interrupts to central processing units (CPUs). An interrupt controller receives an interrupt that is generated by a device coupled to the computer system. The interrupt controller identifies a preferred CPU associated with the device based on a predetermined binding. If the preferred CPU is currently available, the interrupt is sent to the preferred CPU. If the preferred CPU is not currently available, the interrupt is sent to another CPU in the computer system that is currently available.

20 Claims, 5 Drawing Sheets

MANAGING INTERRUPTS USING A PREFERRED BINDING BETWEEN A DEVICE GENERATING INTERRUPTS AND A CPU

TECHNICAL FIELD

Embodiments of the present invention relate to computer systems, and ore specifically, to the management of interrupts in computer systems.

BACKGROUND

In a computer system, an interrupt is a signal generated by a device to indicate the need of attention from a central processing unit (CPU) and its operating system. An interrupt typically causes a CPU to pause and to perform operations requested by the interrupt. An interrupt is a signal raised by a device on a signal line connecting to an interrupt controller. The interrupt controller then sends the interrupt to a CPU. The device may be a physical hardware device or an emulated hardware device. When the CPU receives an interrupt, it saves its state of execution and begins execution of an interrupt handler.

One conventional technique is to send all of the occurrences of an interrupt to a designated CPU in a multi-processor system. This technique has a performance advantage in that the code of the interrupt handler will most likely be found in the CPU cache if the interrupts occur frequently. However, if the designated CPU becomes unavailable, the computer system will experience significant performance degradation.

Another conventional technique is to send the interrupts to any of the CPUs in a multi-processor system. For example, an interrupt can be sent to a CPU chosen at random or based on a round-robin scheme. Without one designated CPU to handle the interrupts, the code of the interrupt handler can bounce from one CPU to another CPU if the interrupts occur frequently. Thus, the computer system will also experience significant performance degradation.

In a virtualized computer system that hosts one or more virtual machines, each virtual machine can have multiple virtual CPUs. When a device generates an interrupt, an interrupt controller, which can be a physical controller or an emulated controller, delivers the interrupt to a virtual CPU in a virtual machine. A computer system may have more virtual CPUs than the physical CPUs in the system. Thus, a virtual CPU will compete for the physical CPU cycles against other virtual CPUs, and may be forced to suspend its operation from time to time to allow other virtual CPUs to run. Moreover, a virtual CPU is similar to a process, which may be temporarily suspended to handle exceptions (e.g., a page fault) or system management functions. The period of suspension can sometimes be very long (e.g., on the order of milliseconds, which is equivalent to millions of physical CPU cycles). When an interrupt is sent to a virtual CPU that is suspended or otherwise not running, the interrupt cannot be serviced until the virtual CPU resumes running. The latency in servicing the interrupt in some computer systems can be so large that these computer systems are rendered unsuitable for running real-time applications.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for binding interrupts to central processing units (CPUs). In one embodiment, an interrupt controller receives an interrupt that is generated by a device coupled to the computer system. The interrupt controller identifies a preferred CPU associated with the device based on a predetermined binding. If the preferred CPU is currently available, the interrupt is sent to the preferred CPU. If the preferred CPU is not currently available, the interrupt is sent to another CPU in the computer system that is currently available.

Techniques described herein are applicable to a virtualized computer system (that is, a computer system hosting one or more virtual machines), as well as a non-virtualized multi-processor system (that is, a multi-processor system that does not host any virtual machine). Thus, unless explicitly indicated, the term "CPU" can refer to either a virtual CPU or a physical CPU. The device described herein refers to a hardware device or an emulated hardware device, which may be externally or internally coupled to the computer system. Embodiments of the invention improve the performance of the computer system by handling interrupts more efficiently. If a predetermined preferred CPU is currently not available to handle an interrupt (e.g., the CPU has blocked all interrupts, the CPU is suspended, etc.), the interrupt will be redirected to another CPU to avoid latency in waiting for the preferred CPU.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
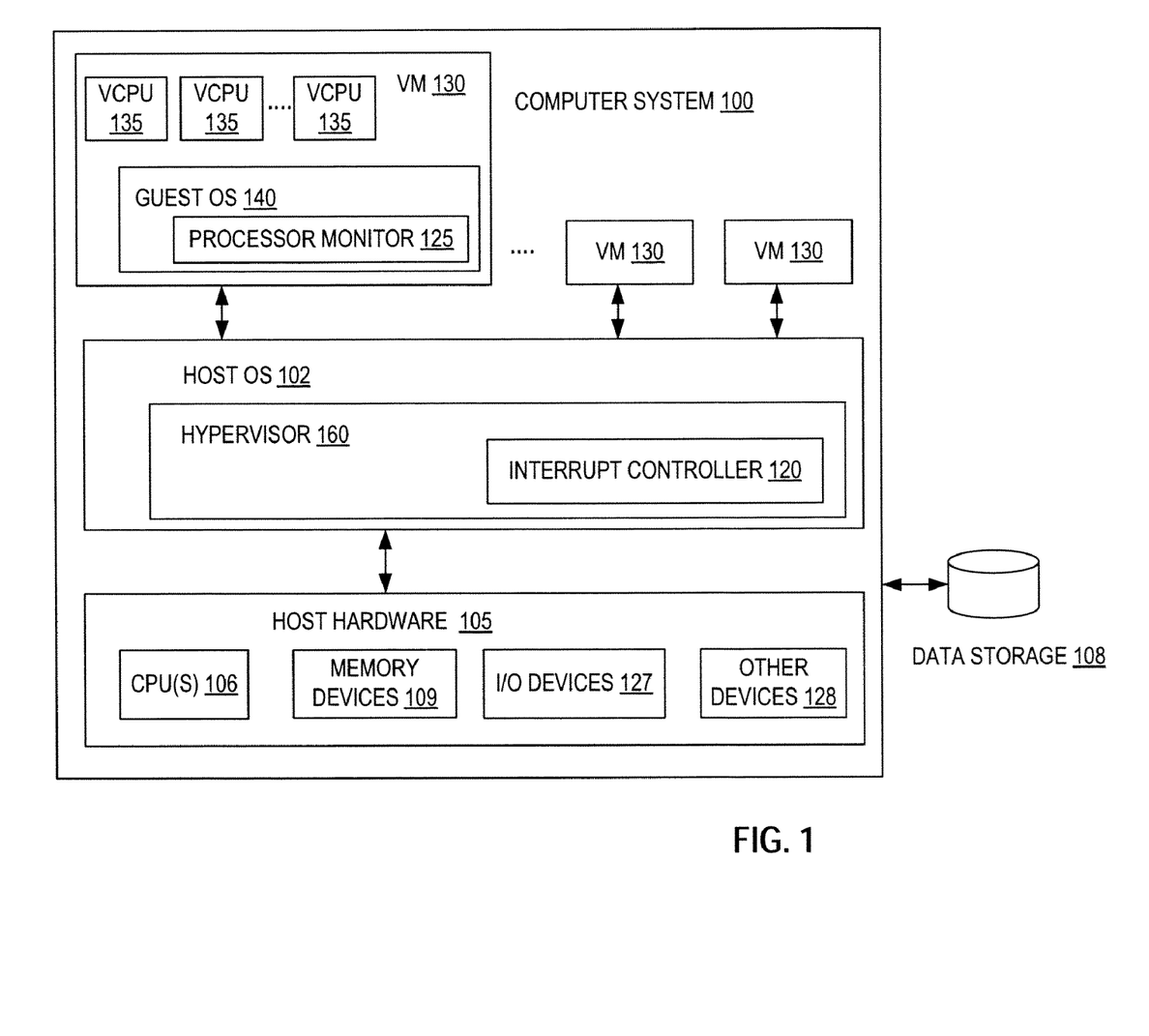
FIG. 1 is a block diagram of a virtualized computer system in which embodiments of the invention may be implemented.

FIG. 1 is a block diagram that illustrates an embodiment of a computer system 100 that hosts a plurality of virtual machines (VM) 130. Each virtual machine 130 may have multiple virtual central processing units (virtual CPUs or VCPUs) 135. Each virtual machine 130 also runs a guest operating system (OS) 140 that has a process thread executed by one of the virtual CPUs 135. Each virtual CPU 135 may handle multiple tasks and may schedule the execution of the tasks to improve efficiency. The computer system 100 may be a server, a workstation, a personal computer (PC), a mobile phone, a palm-sized computing device, a personal digital assistant (PDA), etc.

The virtual machines 130 in the computer system 100 may have the same or different guest operating systems 140, such as Microsoft Windows, Linux, Solaris, etc. The computer system 100 may also run a host OS 102 to manage system resources, including access to memory devices 109, I/O devices 127 and data storage 108.

In one embodiment, the computer system 100 runs a hypervisor 160 to emulate underlying host hardware 105, making the use of the virtual machine 130 transparent to the guest operating systems 140 and the user of the computer system 100. The hypervisor 160 may also be known as a virtual machine monitor (VMM) or a kernel-based hypervisor. In some embodiments, the hypervisor 160 may be part of the host OS 102.

Host hardware 105 includes one or more physical central processing units (CPUs) 106, the memory devices 109 and other hardware components (e.g., the I/O devices 127 and other devices 128, such as audio/video devices, network interface devices, printers, etc.). The host hardware 105 is also coupled to the data storage 108 via a direct connection or a local network. The memory devices 109 may include volatile memory devices (e.g., random access memory (RAM)), non-volatile memory devices (e.g., flash memory), and/or other types of memory devices. The data storage 108 may include mass storage devices, such as magnetic or optical storage based disks, tapes or hard drives.

According to one embodiment of the present invention, the hypervisor 160 emulates an interrupt controller 120 to bind interrupts to their corresponding virtual CPUs 135. The interrupt controller 120 sends interrupts to the corresponding virtual CPUs 135 when it receives the interrupts from the devices coupled to the computer system 100. The devices may be physical hardware devices (e.g., network interface card, I/O devices, etc.) or emulated hardware devices (e.g., a timer in the operating system). The devices may generate interrupts from time to time during the operation of the computer system 100. For example, a network interface card may generate an interrupt when it receives a message from a remote computer via a network. The interrupt controller 120 directs the interrupt to a preferred virtual CPU associated with the device generating the interrupt, if the preferred virtual CPU is available. The interrupt controller 120 has access to the current state of each of the virtual CPUs 135. Therefore, the current state of the preferred virtual CPU with respect to whether it can accept an interrupt is visible to the interrupt controller 120. If the preferred virtual CPU is not currently available, the interrupt controller 120 sends the interrupt to a different virtual CPU that is available.

In one embodiment, the different virtual CPU may be a virtual CPU that is the least busy. The guest operating system 140 may include a processor monitor 125 that monitors the activities of each virtual CPU 135 within a given time period (e.g., in the past 5 minutes). The processor monitor 125 may count the number of interrupts that have been received by each virtual CPU 135 within the given time period. The virtual CPU 135 that receives the least number of interrupts within the given time period can be used as the least busy virtual CPU. In alternative embodiments, the different virtual CPU may be determined based on different metrics (e.g., processor workload or utilization, etc.).

In one embodiment, the interrupt controller 120 maintains a list of preferred binding between each interrupt-generating device and its preferred virtual CPU in a given virtual machine. For example, a network interface card may have a preferred virtual CPU (e.g., virtual CPU 2) in a given virtual machine, and a sound card may have another preferred virtual CPU (e.g., virtual CPU 1) in the given virtual machine. In this example, if the respective preferred virtual CPUs are available, all of the interrupts generated by the network interface card will be directed to virtual CPU 2 and all of the interrupts generated by the sound card will be directed to virtual CPU 1.

Figure 2:
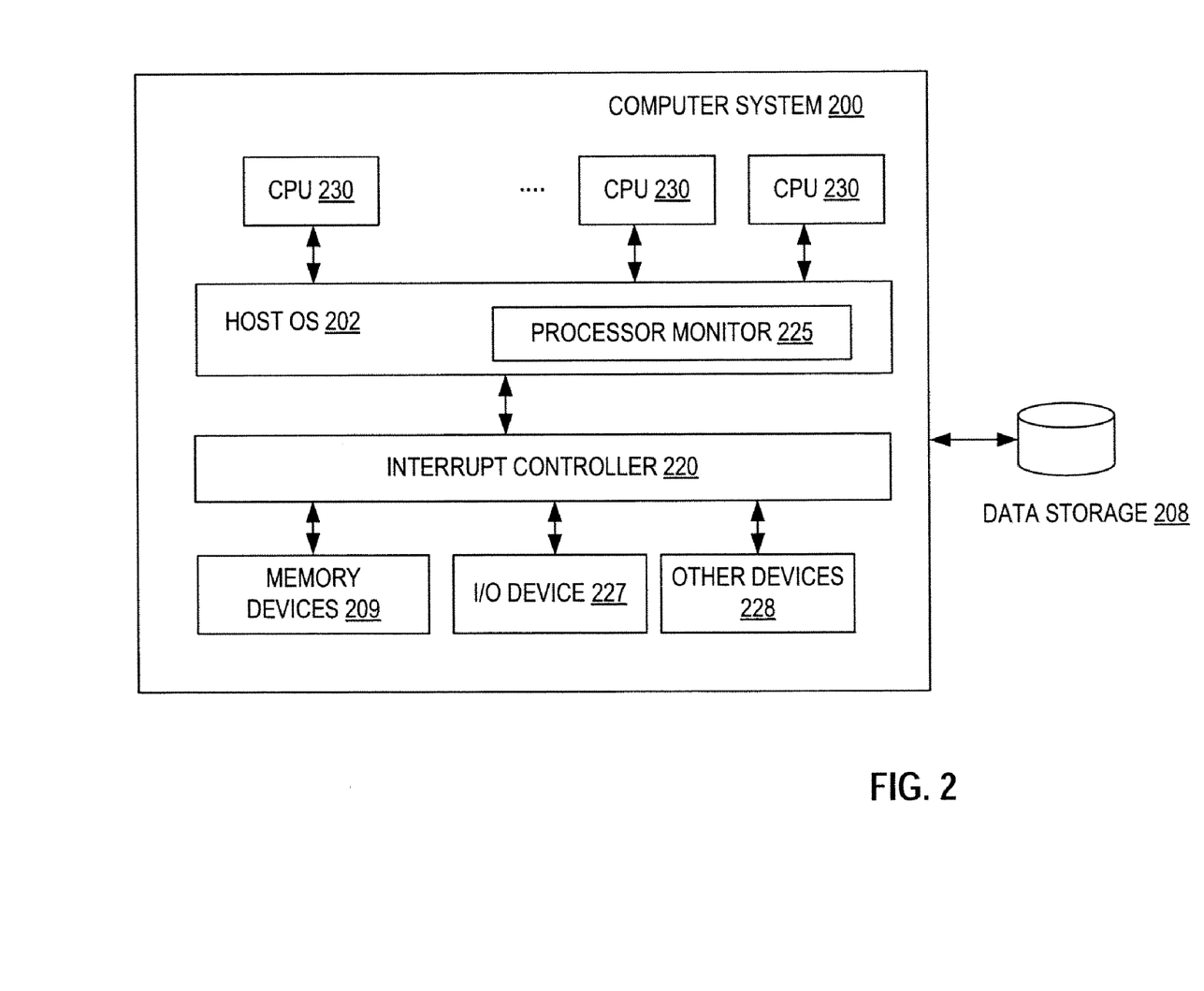
FIG. 2 is a block diagram of a non-virtualized computer system in which embodiments of the invention may be implemented.

Embodiments of the present invention may also apply to a non-virtualized multi-processor system, such as a computer system 200 of FIG. 2. Referring to FIG. 2, the computer system 200 includes an interrupt controller 220, which is a hardware component. The computer system 200 runs a host operating system 202 that further includes a processor monitor 225. The computer system 200 is coupled to data storage 208 via a direct connection or a local network. The data storage 208 may include mass storage devices, such as magnetic or optical storage based disks, tapes or hard drives.

According to one embodiment of the present invention, the interrupt controller 220 and the processor monitor 225 determine the destination (i.e., one of the physical CPU 230) of an interrupt generated by one of the devices (e.g., memory devices 209, I/O devices 227, other devices 228, etc.) coupled to the computer system 200. The interrupt controller 220 maintains a list of preferred binding between each interrupt-generating device and its preferred physical CPU. The interrupt controller 220 also has access to the current state of each of the physical CPUs 230. Thus, the current state of the preferred physical CPU with respect to whether it can accept an interrupt is visible to the interrupt controller 220. The interrupt controller 220 directs an interrupt to a preferred physical CPU associated with the device generating the interrupt, if the preferred physical CPU is currently available. Similar to the description above in connection with FIG. 1, if the preferred physical CPU is not currently available, the interrupt is directed to a different physical CPU that is currently available. This different physical CPU may be a physical CPU that is the least busy. In one embodiment, the processor monitor 225 monitors the activities of each physical CPU 230. The processor monitor 225 may count the number of interrupts that have been received by each physical CPU 230 within a given time period. The physical CPU 230 that receives the least number of interrupts within the given time period can be used as the least busy physical CPU. In alternative embodiments, the different physical CPU may be determined based on different metrics (e.g., processor workload or utilization, etc.).

Figure 3:
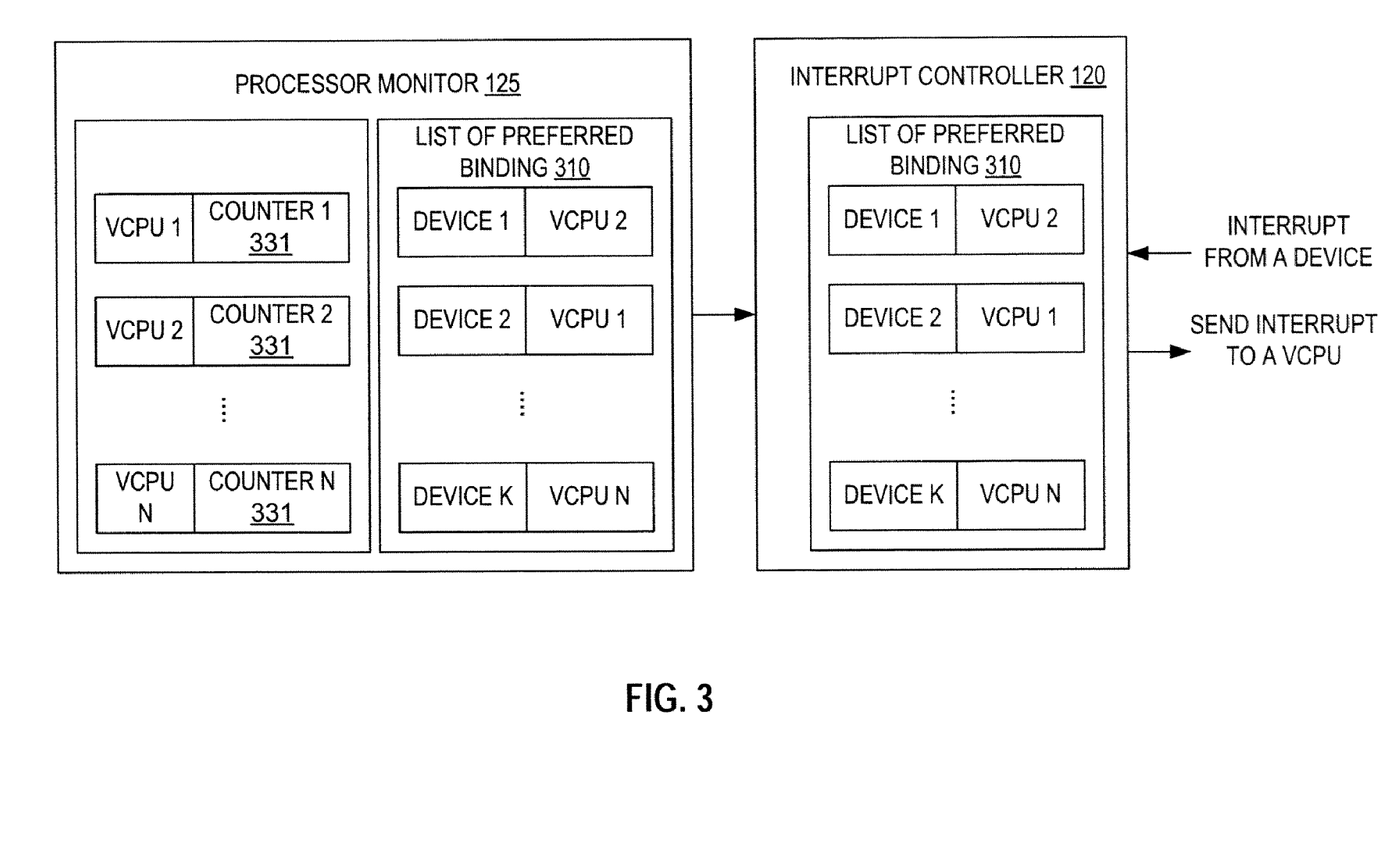
FIG. 3 is a block diagram of one embodiment of an interrupt controller.

FIG. 3 is a block diagram illustrating the information collected by one embodiment of the interrupt controller 120 and the processor monitor 125. For simplicity of the discussion, FIG. 3 only show the components of the computer system 100 of FIG. 1 that comprises virtual machines 130 and virtual CPUs 135. Nevertheless, it is understood that the following description is equally applicable to the interrupt controller 220 and the processor monitor 225 in the multi-processor computer system 200 of FIG. 2.

In one embodiment, the processor monitor 125 monitors the activities of the virtual CPUs on each virtual machine 130 within a time period. In one embodiment, the processor monitor 125 tracks the number of interrupts that each virtual CPU 135 has received within a time period. The number of received interrupts can be used as an indication of the level of activities in the virtual CPU 135. For example, the processor monitor 125 may include a number of counters 331, each counter 331 counting the number of interrupts that a corresponding virtual CPU has received within a given time period (e.g., per minute). Based on the number of interrupts received by the virtual CPU, the processor monitor 125 determines which virtual CPUs are busiest, and generates a list of preferred binding 310 for each virtual machine 130. The list 310 indicates a mapping between the interrupts generated by a device (e.g., device 1) and a preferred virtual CPU (e.g., VCPU 2) for handling the interrupts. The preferred binding 310 evens out the loads of the virtual CPUs. The processor monitor 125 then sends the list of preferred binding 310 to the interrupt controller 120. The sending of the list 310 may be performed on a periodical basis. Although a list is described and shown, it is understood that any suitable data structure may be used.

Figure 4:
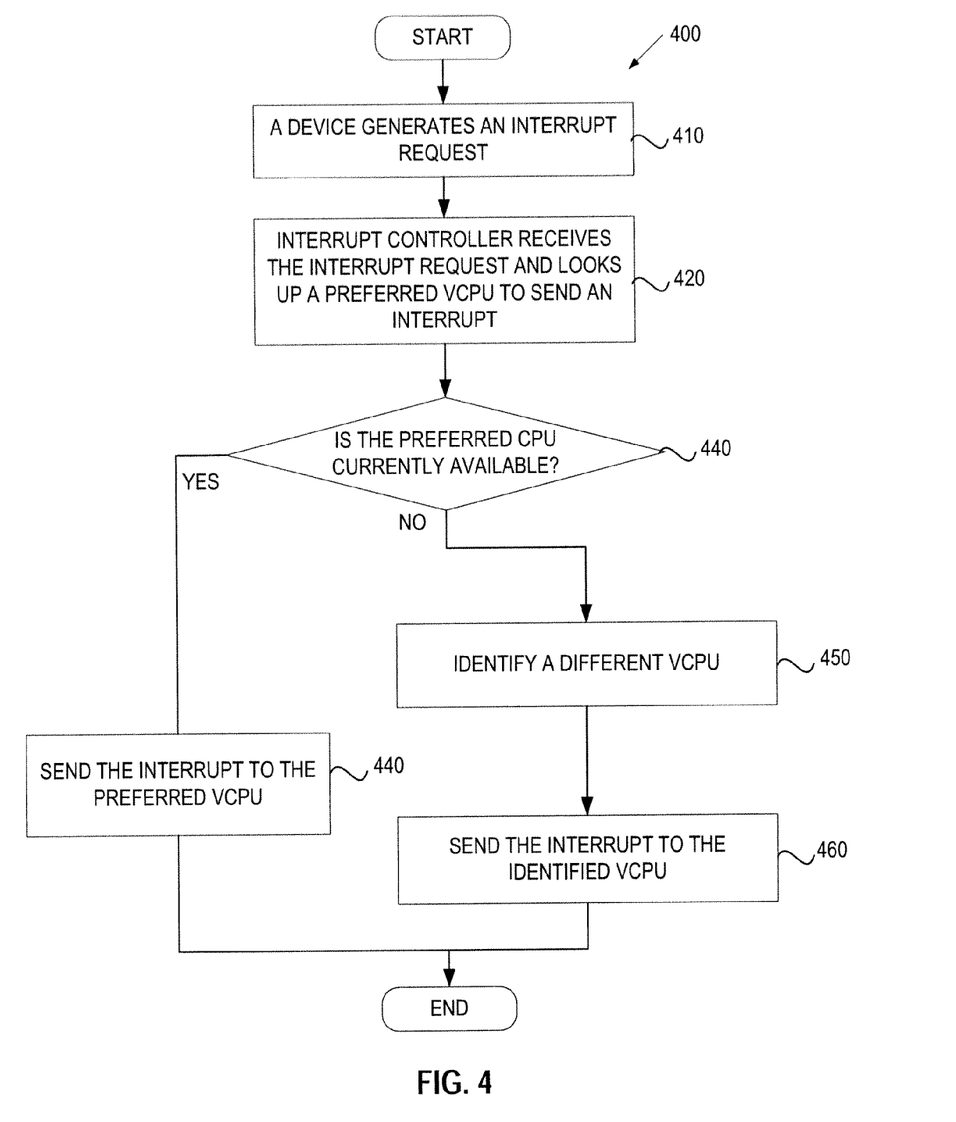
FIG. 4 is a flow diagram of one embodiment of a method for handling interrupt.

FIG. 4 is a flow diagram illustrating one embodiment of a method 400 for directing an interrupt to its destination virtual CPU or physical CPU. The method 400 may be performed by a computer system 500 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the interrupt controller 120 of FIG. 1, or the interrupt controller 220 of FIG. 2. For simplicity of the discussion, the following description only refers to the computer system 100 of FIG. 1. It is understood that the method 400 is also applicable to the computer system 200 of FIG. 2, in which case the term "virtual CPU" is replaced by "physical CPU" in the following description.

Referring to FIG. 4, in one embodiment, the method 400 begins when a device generates an interrupt and sends the interrupt to the interrupt controller 120 (block 410). Based on the list of preferred binding 310 (FIG. 3), the interrupt controller 120 determines a preferred virtual CPU for sending the interrupt (block 420). The interrupt controller 120 accesses the current state of the preferred virtual CPU to determine whether the preferred virtual CPU is currently available (block 430). If the preferred virtual CPU is current available, the interrupt controller 120 sends the interrupt to the preferred virtual CPU (block 440). If the preferred virtual CPU is not currently available, the interrupt controller 120 identifies a different CPU that is currently available (block 450). The interrupt controller 120 then sends the interrupt to the identified virtual CPU (block 460).

In the embodiment of FIG. 1, the processor monitor 125 in the guest operating system 140 may periodically count the number of interrupts that happened on each virtual CPU 135, and, if needed, move interrupts around between the virtual CPUs 135 to even out the load. In the embodiment of FIG. 2, the processor monitor 225 in the host operating system 202 may determine which interrupts are to be sent to which physical CPUs 230 and notify the hardware interrupt controller 220 to operate accordingly. Thus, processor monitors 125 and 223 is capable of balance of the load of interrupts by dynamically adjusting the binding between the CPUs and the interrupts.

Figure 5:
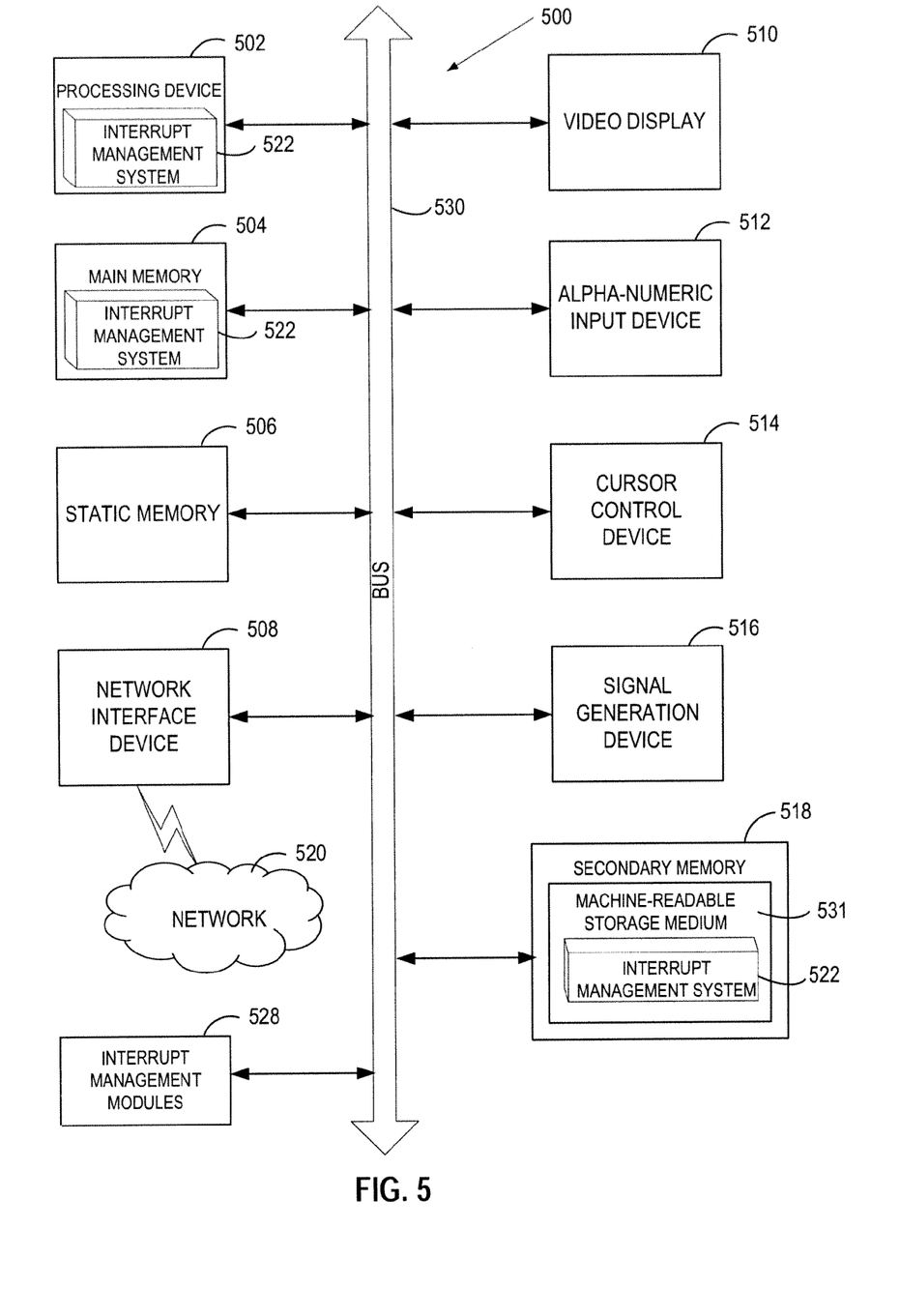
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., an interrupt management system 522) embodying any one or more of the methodologies or functions described herein (e.g., the interrupt controller 120 and the processor monitor 125 of FIGS. 1 and 2). The interrupt management system 522 may also reside, completely or at least partially, within the main memory 504 and/or within the processing device 502 during execution thereof by the computer system 500; the main memory 504 and the processing device 502 also constituting machine-readable storage media. The memory management system 522 may further be transmitted or received over a network 520 via the network interface device 508.

The machine-readable storage medium 531 may also be used to store the interrupt management system 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 500 may additionally include interrupt management modules 528 for implementing the functionalities of the interrupt controller 120 and the processor monitor 125 of FIGS. 1 and 2. The modules 528, components and other features described herein (for example in relation to FIGS. 1 and 2) can be implemented as discrete hardware components or integrated in the functionality of hardware components such as ASICS, FPGAs, DSPs or similar devices. In addition, the modules 528 can be implemented as firmware or functional circuitry within hardware devices. Further, the modules 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "monitoring", "sending", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer system programmed to perform the following, comprising:
   receiving, by an interrupt controller of the computer system, an interrupt generated by a device coupled to the interrupt controller;
   identifying, by the computer system, a preferred central processing unit (CPU) of a plurality of CPUs in the computer system that is associated with the device based on a preferred binding created according to a number of interrupts received by each of the plurality of CPUs over a time period;
   determining, based on a state of the preferred CPU, whether the preferred CPU is currently available;
   in response to a determination that the preferred CPU is not currently available, identifying, by the computer system, a currently available CPU of the plurality of CPUs in the computer system; and
   sending the interrupt from the interrupt controller to the currently available CPU identified by the computer system.

2. The method of claim 1, wherein the CPU identified by the computer system is one of the plurality of virtual CPUs in a virtual machine hosted by the computer system.

3. The method of claim 1, wherein the CPU identified by the computer system is one of a plurality of physical CPUs in the computer system.

4. The method of claim 1, wherein identifying an available CPU in the computer system further comprises:
   monitoring the activities of the plurality of CPUs in the computer system; and
   determining the currently available CPU as a CPU that is currently running and least busy within a time period.

5. The method of claim 1, further comprising:
   monitoring the number of interrupts received by each of the plurality of CPUs in the computer system; and
   determining the currently available CPU as a CPU that is currently running and has received the least number of interrupts within a time period.

6. The method of claim 1, further comprising:
   maintaining a data structure by the interrupt controller, the data structure including a mapping between each of devices that generate interrupts and a corresponding preferred virtual CPU; and
   directing, by the interrupt controller, the interrupt to the preferred CPU according to the data structure.

7. A system comprising:
   a computer system that hosts a plurality of virtual machines, each virtual machine having a plurality of virtual central processing units (CPUs);
   a plurality of devices coupled to the computer system to generate interrupts; and
   a processor monitor in one of the virtual machines to monitor interrupts received by the plurality of virtual CPUs in the virtual machines and to generate a list of preferred bindings between the devices and the virtual CPUs based on a number of interrupts received by each virtual CPU over a time period, the processor monitor to send the list of preferred bindings to an interrupt controller to direct the interrupts to preferred virtual CPUs.

8. The system of claim 7, wherein the processor monitor identifies a least busy virtual CPU for the interrupt controller to direct the interrupt.

9. The system of claim 7, wherein the processor monitor identifies a virtual CPU that receives the least number of interrupts within the time period for the interrupt controller to direct the interrupt.

10. The system of claim 7, wherein the interrupt controller is emulated by a hypervisor in the computer system.

11. The system of claim 7, wherein the processor monitor resides in a guest operating system.

12. A system comprising:
   a computer system comprising a plurality of physical central processing units (CPUs);
   a plurality of devices coupled to the computer system to generate interrupts; and
   a processor monitor residing in a host operating system of the computer system to monitor interrupts received by the physical CPUs and to generate a list of preferred bindings between the devices and the physical CPUs based on a number of interrupts received by each physical CPU over a time period, the processor monitor to send the list of preferred bindings to an interrupt controller to direct the interrupts to preferred physical CPUs.

13. The system of claim 12, wherein the processor monitor determines which interrupts are to be sent to which of the physical CPUs.

14. The system of claim 12, wherein the processor monitor identifies a least busy physical CPU for the interrupt controller to direct the interrupt.

15. A computer readable storage medium including instructions that, when executed by a processing system, cause the processing system to perform a method comprising:
   receiving, by an interrupt controller of a computer system, an interrupt generated by a device coupled to the interrupt controller;
   identifying, by the computer system, a preferred central processing unit (CPU) of a plurality of CPUs in the computer system that is associated with the device based on a preferred binding created according to a number of interrupts received by each of the plurality of CPUs over a time period;
   determining, based on a state of the preferred CPU, whether the preferred CPU is currently available;
   in response to a determination that the preferred CPU is not currently available, identifying, by the computer system, a currently available CPU of the plurality of CPUs in the computer system; and
   sending the interrupt from the interrupt controller to the currently available CPU identified by the computer system.

16. The computer readable storage medium of claim 15, wherein the CPU identified by the computer system is one of a plurality of virtual CPUs in a virtual machine hosted by the computer system.

17. The computer readable storage medium of claim 15, wherein the CPU identified by the computer system is one of a plurality of physical CPUs in the computer system.

18. The computer readable storage medium of claim 15, wherein identifying an available CPU in the computer system further comprises:
   monitoring the activities of the plurality of CPUs in the computer system; and
   determining the currently available CPU as a CPU that is currently running and least busy within a time period.

19. The computer readable storage medium of claim 15, further comprising:
   monitoring the number of interrupts received by each of the plurality of CPUs in the computer system; and
   determining the currently available CPU as a CPU that is currently running and has received the least number of interrupts within a time period.

20. The computer readable storage medium of claim 15, further comprising:
   maintaining a data structure by the interrupt controller, the data structure including a mapping between each of devices that generate interrupts and a corresponding preferred virtual CPU; and
   directing, by the interrupt controller, the interrupt to the preferred CPU according to the data structure.

* * * * *